(12) United States Patent
Meid

(10) Patent No.: US 8,958,195 B2
(45) Date of Patent: Feb. 17, 2015

(54) ELECTRONIC OVERCURRENT RELEASE FOR CIRCUIT BREAKERS

(75) Inventor: Wolfgang Meid, Muelheim-Kaerlich (DE)

(73) Assignee: Eaton Electrical IP GmbH & Co. KG, Schoenefeld (DE)

( * ) Notice: Subject to any disclaimer, the term of this patent is extended or adjusted under 35 U.S.C. 154(b) by 269 days.

(21) Appl. No.: 13/574,324

(22) PCT Filed: Jan. 20, 2011

(86) PCT No.: PCT/EP2011/050759
§ 371 (c)(1),
(2), (4) Date: Dec. 8, 2012

(87) PCT Pub. No.: WO2011/089186
PCT Pub. Date: Jul. 28, 2011

(65) Prior Publication Data
US 2013/0100569 A1    Apr. 25, 2013

(30) Foreign Application Priority Data
Jan. 21, 2010  (DE) ............... 20 2010 001 197 U

(51) Int. Cl.
  *H02H 3/08*  (2006.01)
  *H02H 3/04*  (2006.01)
  *H02H 3/00*  (2006.01)
  *H02H 7/085* (2006.01)

(52) U.S. Cl.
  CPC ............ *H02H 3/08* (2013.01); *H02H 3/044* (2013.01); *H02H 3/006* (2013.01); *H02H 7/085* (2013.01)
  USPC ........................................ 361/115

(58) Field of Classification Search
  USPC ................................ 318/782, 34; 361/115
  See application file for complete search history.

(56) References Cited

U.S. PATENT DOCUMENTS

| | | | | |
|---|---|---|---|---|
| 4,819,125 A * | 4/1989 | Arinobu et al. | | 361/97 |
| 4,870,532 A | 9/1989 | Beatty | | |
| 5,691,871 A * | 11/1997 | Innes | | 361/96 |
| 7,737,645 B2 * | 6/2010 | Meid | | 318/34 |

FOREIGN PATENT DOCUMENTS

| | | |
|---|---|---|
| DE | 10209068 C1 * | 11/2003 |
| DE | 102006011713 A1 | 10/2007 |
| EP | 0774821 A2 | 5/1997 |

* cited by examiner

*Primary Examiner* — Rexford Barnie
*Assistant Examiner* — Angela Brooks
(74) *Attorney, Agent, or Firm* — Leydig, Voit & Mayer, Ltd.

(57) ABSTRACT

An electronic overcurrent release for circuit breakers includes a first setting device connected to at least one control input of a microcontroller and configured to set a selected suitable nominal current value in a range between a minimum nominal current value and a maximum nominal current value. A second setting device is connected to at least one control input of the microcontroller and configured to set a selected suitable lag level, the second setting device having a test position. In the test position, the microcontroller has a set fixed test current value, which is less than the minimum nominal current value, and a set fixed test delay time, the microcontroller providing a release signal at a release signal output upon at least one of the phase currents exceeding a value of the set fixed test current value and a time of the set fixed test delay time.

5 Claims, 3 Drawing Sheets

ELECTRONIC OVERCURRENT RELEASE FOR CIRCUIT BREAKERS

CROSS-REFERENCE TO PRIOR APPLICATIONS

This application is a U.S. National Phase application under 35 U.S.C. §371 of International Application No. PCT/EP2011/050759, filed on Jan. 20, 2011, and claims benefit to German Patent Application No. DE 10 2010 001 197.3, filed on Jan. 21, 2010. The International Application was published in German on Jul. 28, 2011 as WO 2011/089186 under PCT Article 21(2).

FIELD

The invention relates to an electronic overcurrent release for circuit breakers, in particular for motor circuit breakers.

BACKGROUND

DE 10 2006 011 713 A1 discloses a generic electronic overcurrent release for motor circuit breakers. For each of the current phases which are to be switched and protected, the overcurrent release comprises the primary side of a current transformer, the secondary side of which is connected to a load resistor via a rectifier arrangement. When the current transformers are unsaturated, the load voltages are a proportional function of the phase currents. Via smoothing circuits, the load voltages reach a microcontroller. The outputs of two multi-stage setting switches are also located at the microcontroller. A suitable nominal current value for the load which is connected to the circuit breaker can be selected by means of the first setting switch. By means of the second setting switch, the lag level for the release of the circuit breaker is selected, that is to say the delay with which a load which is connected to the circuit breaker is to be switched off if at least one of the phase currents persistently exceeds the selected nominal current. The greater the amount by which the set nominal current value is exceeded, the more rapidly the load is switched off. As a function of the selected settings, a corresponding overcurrent release characteristic is activated in the microcontroller. When an overcurrent occurs, that is to say as a result of the set nominal current value being exceeded for a delay time which corresponds to the selected lag level and to the measured overcurrent, a release signal is emitted at the output of the microcontroller, and after amplification is supplied to an electromagnetic actuator, which in turn releases the switch mechanism of the circuit breaker to switch off. For overcurrents of the short circuit type, a signal is supplied to the microcontroller via a threshold circuit by way of the corresponding load voltage, and this causes rapid release. Moreover, the voltage for the active electronic components of the release unit is supplied from the output of the rectifier circuits.

DE 102 09 068 C1 discloses a testing arrangement for electronic overcurrent releases of this type of a circuit breaker. The testing arrangement comprises a testing unit, which corresponds to the circuit breaker, which is calibrated to and tested for current values, and which is also loaded by the circuit breaker by way of the test variable. Further, a monitoring unit is provided for detecting and signalling the release of the overcurrent release. For this purpose, the load has to be separated from the circuit breaker, and the feed and load terminals of all of the phase currents of the circuit breaker have to be connected in series and be loaded by a test current source. Further, the secondary sides of the current transformers, which are now loaded by the same test current, of the overcurrent release have to be separated in part from the evaluating components of the overcurrent release and instead connected to the testing unit of the test arrangement. For this purpose it can be tested, at the place of use of the circuit breaker, whether the chain of action for the electronic release works and the release takes place within the acceptable tolerances.

Often, a prediction is merely required as to whether, at the place of use of a circuit breaker, the electronic overcurrent release will work over the entire chain of action, without making quantitative predictions as to the adherence to tolerance limits, at a considerable expense in terms of testing means, load disconnection and series connection of the phase terminals of the circuit breaker, as well as bypasses for the current transformer outputs.

SUMMARY

In an embodiment, the present invention provides an electronic overcurrent release for circuit breakers. A plurality of current transformers each have a primary side that is linked to a respective one of a plurality of phase currents that are to be switched and connected to a load resistor via a rectifier arrangement. A microcontroller has a plurality of measurement inputs each operatively connected to one of the load resistors and a signal output operatively connected to an electromagnetic actuator. A first setting device is connected to at least one control input of the microcontroller and configured to set a selected suitable nominal current value in a range between a minimum nominal current value and a maximum nominal current value. A second setting device is connected to at least one control input of the microcontroller and configured to set a selected suitable lag level, the second setting device having a test position. A voltage supply device is connected to the rectifier arrangement and configured to supply electronic components, including the microcontroller. The microcontroller includes a particular overcurrent release characteristic that is set as a function of the selected settings of the first and second setting devices, the microcontroller being configured to provide a release signal at the release signal output so as to activate the actuator and switch off a circuit breaker connectable to the overcurrent release upon at least one of the phase currents exceeding a value and a time of the overcurrent release characteristic. In the test position of the second setting device, the microcontroller has a set fixed test current value, which is less than the minimum nominal current value, and a set fixed test delay time, the microcontroller being configured to provide a release signal at the release signal output upon at least one of the phase currents exceeding a value of the set fixed test current value and a time of the set fixed test delay time.

BRIEF DESCRIPTION OF THE DRAWINGS

The present invention will be described in even greater detail below based on the exemplary, schematic figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
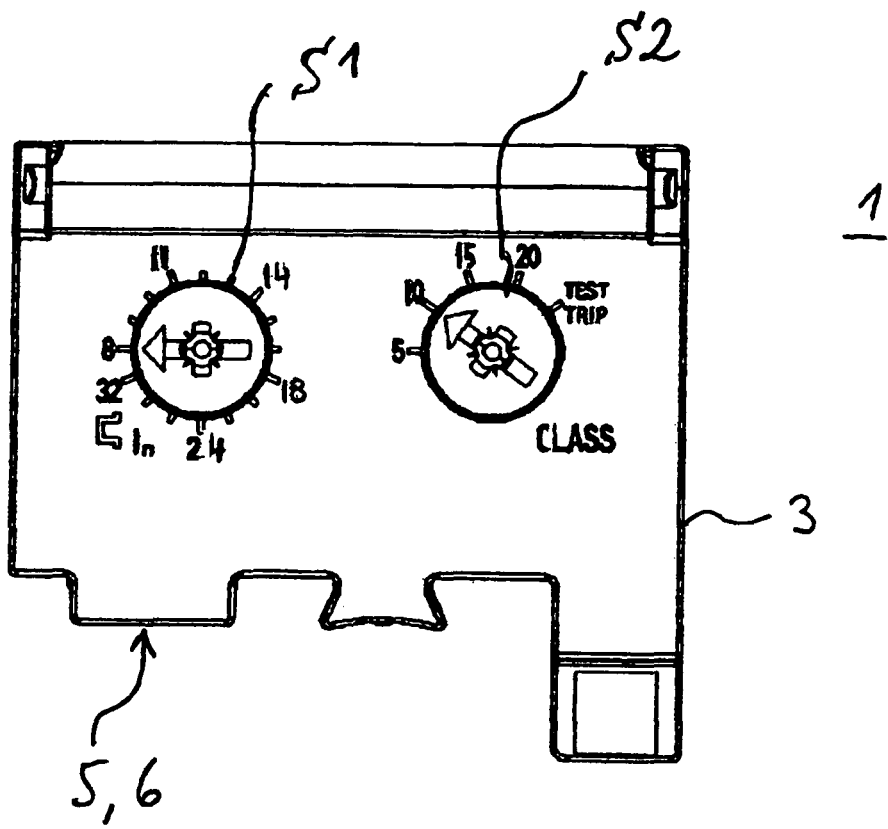
FIG. 1 is a front view of an electronic overcurrent release according to an embodiment of the invention.

In an embodiment, the invention provides a test arrangement which makes it possible, with a low expenditure of time and materials, to test the chain of action of an electronic overcurrent release.

With the overcurrent release according to an embodiment of the invention, a corresponding software-based or stored overcurrent characteristic is activated in the microcontroller, both by means of the first setting device for selecting the nominal current value and by means of the second setting device for selecting the lag level. If at least one of the phase currents which are detected by means of the current transformer exceeds the value and time of this release characteristic, a release signal is present at the release output of the microcontroller, and as a result the electromagnetic actuator is activated. According to an embodiment of the invention, the second setting device is additionally provided with a test position. In the test position, a software-based or stored test current value and a software-based or stored test delay time are active in the microcontroller. The test current value is set to be less than the minimum nominal current value, irrespective of the nominal current value which is selected by means of the first setting device. If at least one of the phase currents exceeds this test current value for at least the set test delay time, the release signal is present at the release signal output and the electromagnetic actuator is active.

Thus, in the test position, the entire chain of action is tested as to the functionality thereof, from the current detection by means of the current transformer to the activation of the release by means of the electromagnetic actuator. No expensive test arrangement is necessary for testing the overcurrent release function of the overcurrent release according to an embodiment of the invention. Moreover, for testing, no preparatory connection or wiring operations are required on a circuit breaker which is equipped with the overcurrent release according to an embodiment of the invention, so as initially to separate the phase terminals thereof from the current feed and the load and subsequently to load them serially with a test current supply. Further, no measures are required to electrically separate the secondary sides of the current transformers in part from the remaining overcurrent release and to connect them to a testing unit. The testing is thus carried out without any external testing means and without additional operational measures, directly at the place of use and in the working state of a circuit breaker which is equipped with the overcurrent release according to an embodiment of the invention.

A test current value of approximately 80% of the minimum nominal current value has been found to be expedient.

It is advantageous for the value of the test delay time to be greater than the time in which the voltage supply which is provided by the current transformers for the electronic components builds up to faultless operation of the electronic overcurrent release. For this purpose, a value of approximately 500 ms for the test delay time has been found to be expedient.

To save space, it is advantageous for the first and second setting devices to be logically interconnected and to be able to be interrogated alternately.

The electronic overcurrent release 1 according to FIG. 1 is provided for installation on a motor circuit breaker. The housing 3 of the overcurrent release 1 is equipped, in a known manner, with fastening and locking means for installation on the motor circuit breaker. Reference numerals 5 and 6 denote two electric contacts, via which an electromagnetic actuator can be supplied with electricity by a motor circuit breaker via the housing 3. On the front face of the housing 3, a first setting device S1 and a second setting device S2 are accessible. From each of the setting devices S1 and S2, a rotary element 7 or 8, which can be actuated by means of a screwdriver-like tool, can be seen together with an associated scale. The value of the nominal current can be selected at sixteen levels by means of the first setting device S1, in the present example from a minimum nominal current value of 8 A to a maximum nominal current value of 32 A. By means of the second setting device S2, the lag level can be selected at a plurality of levels or a test position (TEST TRIP) can be selected. Together, the selection of the nominal current value and of the lag level determines the release characteristic of the overcurrent release 1.

Figure 2:
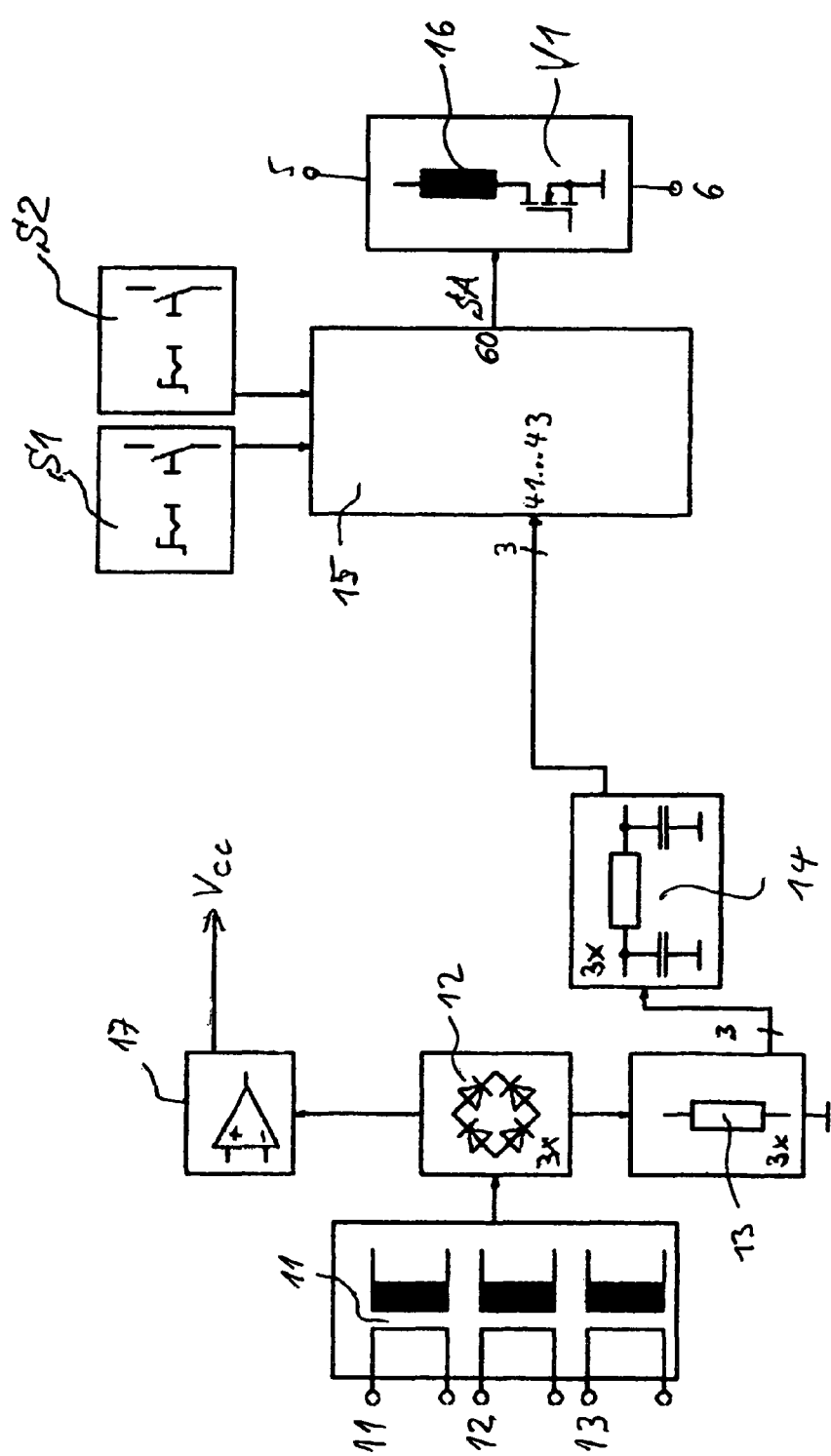
FIG. 2 is a simplified block diagram of the overcurrent release according to FIG. 1.

FIG. 2 shows the basic circuit arrangement of the overcurrent release 1. The drawing of FIG. 2 has been simplified in that circuit parts which are not essential to the invention and which are already known, for example for rapid switch-off in the case of phase currents of the short-circuit type or for producing what is known as a thermal memory, are not shown. The primary sides of one current transformer 11 in each case are linked to the three phase currents I1, I2 and I3 which are supplied by a motor circuit breaker. The currents of the secondary sides of the current transformers 11 each reach a load resistor 13 via a respective rectifier arrangement 12. When the current transformers 11 are unsaturated, the voltages across the load resistors 13 are a proportional function of the phase currents I1, I2, I3. Via smoothing circuits 14, the load voltages reach measurement inputs 41 to 43 of a microcontroller 15. The outputs of the setting devices S1 and S2 are also supplied to the microcontroller 15. A particular overcurrent release characteristic comes into effect in the microcontroller 15 in accordance with the selected settings for the nominal current value, by means of the first setting device S1, and for the lag level for the release, by means of the second setting device S2. If at least one of the phase currents I1, I2, I3 exceeds the value and duration of this release characteristic, a release signal SA is present at a signal output 60 of the microcontroller 15. Via a transistor switch V1, the release signal SA causes the electromagnetic actuator 16 to be activated. Via an interface which passes through the housing 3 (FIG. 1), the actuator 16 actuates the switching mechanism of a motor circuit breaker, which is connected to the release 1, in such a way that the phase currents I1, I2, I3 are interrupted. The actuator 16 is supplied as was described previously in relation to FIG. 1, via the contacts 5 and 6. A network component 17, which supplies the electronics of the overcurrent release 1 with the supply voltage Vcc, is also connected to the rectifier arrangements 12.

If the test position is selected with the second setting device S2, a test current value of 80% of the minimum nominal current value comes into effect in the microcontroller 15. In the present example, the test current value is 0.8×8 A=6.4 A, and this holds true irrespective of the setting of the first setting device S1. Further, as a result of the test position, a test delay time of 0.5 s comes into effect in the microcontroller 15. If in the test position the phase currents I1, I2, I3 are switched on by switching on the motor circuit breaker which is connected to the release, they are detected and measured by way of the chain of action consisting of the current transformer 11, the rectifier arrangements 12, the load resistors 13, the smoothing circuits 14 and the microcontroller 15. In general, the detected and measured phase currents I1, I2, I3 are at least 80% (in the present example 6.4 A or more) of the minimum nominal current value. After the test delay time of 0.5 s from switching on the phase currents I1, I2 and I3 has elapsed, the microcontroller 15 emits a release signal SA at the signal output 60, as a result of which the actuator 16 is activated and the motor circuit breaker is switched off. In this way, the functionality test of the entire chain of action from the current transformers 11 to the actuator 16 would have been carried out successfully. Delaying the release by the test delay time of 0.5 s provides that, by this point, the supply current Vcc has built up sufficiently that reliable operation of the electronic overcurrent release 1 is ensured in this respect.

Figure 3:
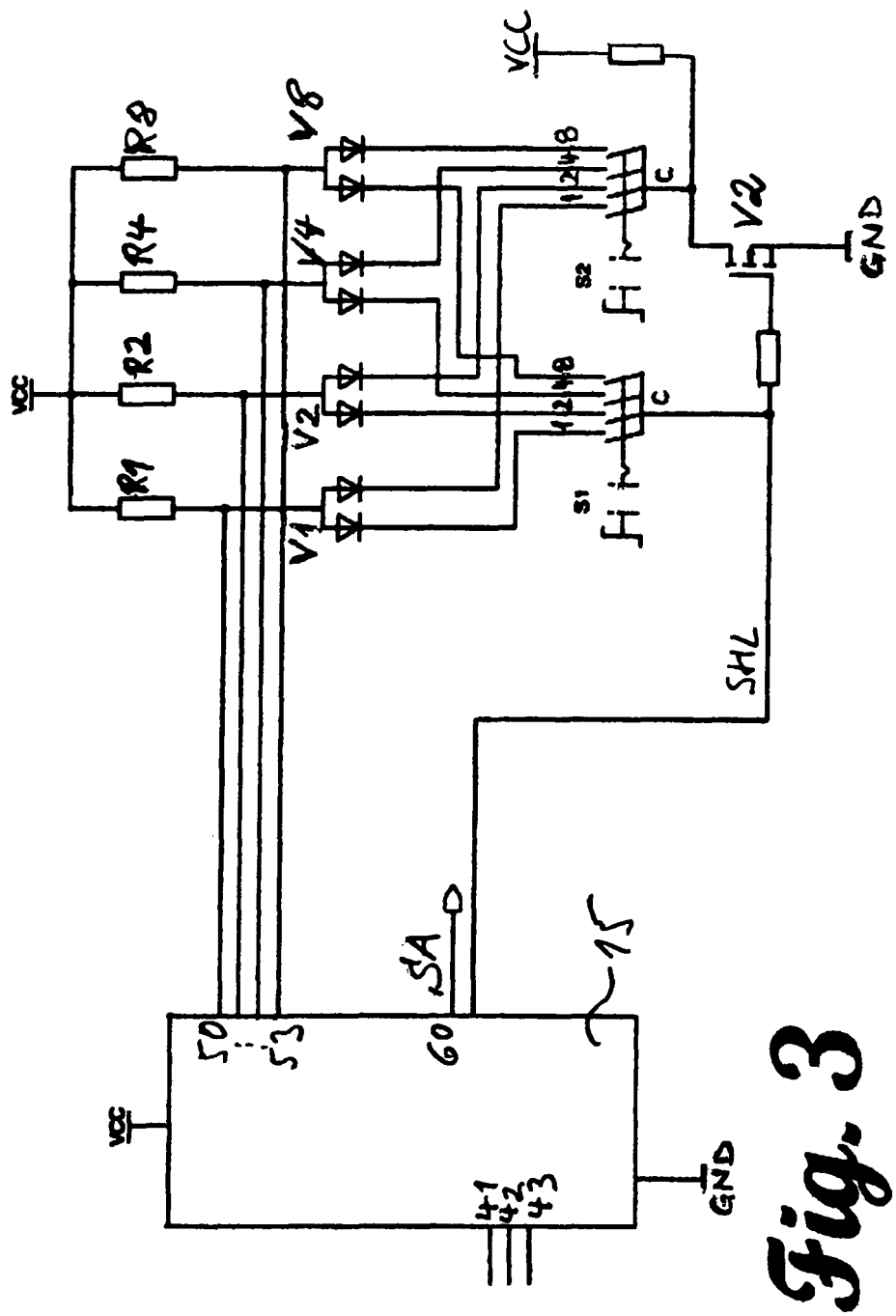
FIG. 3 shows the detailed arrangement of the overcurrent release according to FIG. 2.

FIG. 3 shows a compact configuration of the first and the second setting devices S1 and S2 respectively. The first setting device S1 consists of a dual 16-setting switch (hexadecimal switch), and the second setting device S2 consists of a 10-setting dual switch (decimal switch). The two setting devices S1, S2 have one input each and four dual-level outputs each. The respectively equal-valued outputs of the two setting devices S1, S2 are logically OR-linked, via diode pairs V1, V2, V4 and V8 and a respective link resistor R1, R2, R4 and R8 which counters the supply voltage Vcc, and supplied to the control inputs 50 to 53 of the microcontroller 15. The microcontroller 15 outputs an interrogation signal SHL, which continually alternates between HIGH and LOW, directly to the input of the first setting device S1 and indirectly, via a negation stage comprising a switching transistor V2, to the second setting device S2. In this way, the dual outputs of the first and second setting devices S1 and S2 each alternately become active, and are interrogated by the microcomputer 16 via the control inputs 50 to 53, together with the alternation of the interrogation signal SHL.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

LIST OF REFERENCE NUMERALS

| | |
|---|---|
| 1 | overcurrent release |
| 3 | housing |
| 5, 6 | contacts for actuator |
| 11 | current transformer |
| 12 | rectifier arrangement |
| 13 | load resistor |
| 14 | smoothing circuit |
| 15 | microcontroller |
| 16 | actuator |
| 17 | network component |
| 41 ... 43 | measurement inputs |
| 50 ... 53 | control inputs |
| 60 | signal outputs |
| I1, I2, I3 | phase currents |
| R1, R2, R4, R8 | link resistors |
| SA | release signal |
| S1, S2 | setting devices |
| Vcc | supply voltage |
| V1, V2, V4, V8 | diode pairs |
| V1 | transistor switch |
| V2 | switch transistor |

The invention claimed is:

1. An electronic overcurrent release for circuit breakers, comprising:
    a plurality of current transformers each having a primary side that is linked to a respective one of a plurality of phase currents that are to be switched and connected to a load resistor via a rectifier arrangement;
    a microcontroller having a plurality of measurement inputs each operatively connected to one of the load resistors and a signal output operatively connected to an electromagnetic actuator;
    a first setting device connected to at least one control input of the microcontroller and configured to set a selected suitable nominal current value in a range between a minimum nominal current value and a maximum nominal current value;
    a second setting device connected to at least one control input of the microcontroller and configured to set a selected suitable lag level, the second setting device having a test position; and
    a voltage supply device connected to the rectifier arrangement and configured to supply electronic components, including the microcontroller, and
    wherein the microcontroller includes a particular overcurrent release characteristic that is set as a function of the selected settings of the first and second setting devices, the microcontroller being configured to provide a release signal at the release signal output so as to activate the actuator and switch off a circuit breaker connectable to the overcurrent release upon at least one of the phase currents exceeding a value and a time of the overcurrent release characteristic, and
    wherein, in the test position of the second setting device, the microcontroller has a set fixed test current value, which is less than the minimum nominal current value, and a set fixed test delay time, the microcontroller being configured to provide a release signal at the release signal output upon at least one of the phase currents exceeding a value of the set fixed test current value and a time of the set fixed test delay time.

2. The electronic overcurrent release according to claim 1, wherein the test current value is approximately 80% of the minimum nominal current value.

3. The electronic overcurrent release according to claim 1, wherein the test delay time is set so as to be greater than a time to build up a sufficient supply voltage for the electronic components.

4. The electronic overcurrent release according to claim 1, wherein the test delay time is approximately 500 ms.

5. The electronic overcurrent release according to claim 1, wherein the first and second setting devices are logically combined with one another and configured to be interrogated alternately.

* * * * *